United States Patent
Xiao

(10) Patent No.: US 10,698,623 B2
(45) Date of Patent: Jun. 30, 2020

(54) DATA PROCESSING METHOD AND APPARATUS AND STORAGE MEDIUM

(71) Applicant: Tencent Technology (Shenzhen) Company Limited, Shenzhen (CN)

(72) Inventor: Tao Xiao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 10 days.

(21) Appl. No.: 16/220,678

(22) Filed: Dec. 14, 2018

(65) Prior Publication Data

US 2019/0121559 A1 Apr. 25, 2019

Related U.S. Application Data

(63) Continuation of application No. PCT/CN2017/103239, filed on Sep. 25, 2017.

(30) Foreign Application Priority Data

Oct. 8, 2016 (CN) .......................... 2016 1 0882278

(51) Int. Cl.
*G06F 12/02* (2006.01)
*G06F 3/06* (2006.01)
(Continued)

(52) U.S. Cl.
CPC ............ *G06F 3/0631* (2013.01); *G06F 3/067* (2013.01); *G06F 3/0614* (2013.01);
(Continued)

(58) Field of Classification Search
None
See application file for complete search history.

(56) References Cited

U.S. PATENT DOCUMENTS 9,218,204 B2 12/2015 O'Connor et al.
2016/0253119 A1* 9/2016 Reynolds .............. G06F 3/0664
711/170

FOREIGN PATENT DOCUMENTS

CN 103078946 5/2013
CN 103379156 10/2013
(Continued)

OTHER PUBLICATIONS

Bienkowski, et al., "Dynamic Load Balancing in Distributed Hash Tables", (c) Feb. 2005, Computer Science, p. 1-7. (Year: 2005).*

(Continued)

*Primary Examiner* — Brian R Peugh
(74) *Attorney, Agent, or Firm* — Oblon, McClelland, Maier & Neustadt, L.L.P.

(57) ABSTRACT

A method and an apparatus for data processing are provided. Interface circuitry connects the apparatus in a distributed system. Processing circuitry generates first hash values for a first group of virtual nodes to be added into a hash ring. The first group of virtual nodes represents a first newly added device in the distributed system. Then, the processing circuitry distributes the data in the distributed system according to the hash ring that includes the first group of virtual nodes. When the distribution of the data in the distribution system fails to satisfy a uniformity requirement, the processing circuitry identifies a specific virtual node in the first group of virtual nodes that causes the distribution to fail the uniformity requirement. Then, a hash value for a makeup virtual node to replace the specific virtual node is generated to update the distribution of the data in the distributed system.

20 Claims, 6 Drawing Sheets

(51) Int. Cl.
*H04L 29/08* (2006.01)
*G06F 16/27* (2019.01)
*G06F 9/50* (2006.01)
*G06F 9/455* (2018.01)

(52) U.S. Cl.
CPC .......... *G06F 3/0632* (2013.01); *G06F 3/0647* (2013.01); *G06F 3/0662* (2013.01); *G06F 9/45558* (2013.01); *G06F 9/50* (2013.01); *G06F 16/278* (2019.01); *H04L 67/1046* (2013.01); *H04L 67/1048* (2013.01); *H04L 67/1065* (2013.01); *G06F 12/023* (2013.01); *G06F 2009/4557* (2013.01); *G06F 2206/1012* (2013.01)

(56) References Cited

FOREIGN PATENT DOCUMENTS

| CN | 103605789 | 2/2014 |
| CN | 104219163 | 12/2014 |
| CN | 104391863 | 3/2015 |
| CN | 105095315 | 11/2015 |
| CN | 105187547 | 12/2015 |

OTHER PUBLICATIONS

Kapoor, "A Survey on Dynamic Load Balancing algorithms in Cloud Computing", (c) 2015 Advances in Computer Science and Information Technology, p. 87-91. (Year: 2015).*

International Search Report dated Jan. 3, 2018 in PCT/CN2017/103239 filed Sep. 25, 2017. (With English Translation).

Written Opinion dated Jan. 3, 2018 in PCT/CN2017/103239 filed Sep. 25, 2017.

Chinese Office Action dated Oct. 16, 2018 in CN Application 201610882278.5 filed on Oct. 8, 2016. (With Concise English Translation).

Tian, Lang-Jun et al., Research on Dynamic Load Balancing Algorithm in Cloud Storage System., Computer Engineering, 2013, 39(10): 19-23.(With English Abstract).

* cited by examiner

DATA PROCESSING METHOD AND APPARATUS AND STORAGE MEDIUM

RELATED APPLICATION

This application is a continuation of International Application No. PCT/CN2017/103239, filed on Sep. 25, 2017, which claims priority to Chinese Patent Application No. 201610882278.5 filed on Oct. 8, 2016. The entire disclosures of the prior applications are incorporated by reference herein in their entirety.

FIELD OF THE TECHNOLOGY

The present disclosure relates to the field of computer technologies, and in particular, to a data processing method and apparatus and a storage medium.

BACKGROUND OF THE DISCLOSURE

With the rapid network development and the increasing data amount, uniform distribution of data in a distributed system is the key to ensuring normal operation of the distributed system. For example, when a machine in the distributed system crashes due to an excessively large amount of data in the machine, all data in the machine cannot be accessed and needs to be migrated to another machine; as a result, the distributed system becomes unstable. Therefore, how to ensure uniform distribution of data in machines in the distributed system is a problem that urgently needs to be resolved.

SUMMARY

Embodiments of the present disclosure disclose a data processing method and apparatus and a storage medium, to achieve uniform distribution of data in machines.

A method and an apparatus for data processing are provided. For example, the apparatus includes interface circuitry and processing circuitry. In some embodiments, the interface circuitry connects the apparatus in a distributed system, and the processing circuitry generates first hash values respectively for a first group of virtual nodes to be added into a hash ring that is used to distribute data in the distributed system. The first group of virtual nodes represents a first newly added device, such as a data storage device, and the like in the distributed system. Then, the processing circuitry distributes the data in the distributed system according to the hash ring that includes the first group of virtual nodes with the first hash values. Further, the processing circuitry determines whether the distribution of the data in the distributed system satisfies a uniformity requirement. When the distribution of the data in the distribution system fails to satisfy the uniformity requirement, the processing circuitry identifies a specific virtual node in the first group of virtual nodes that causes the distribution to fail the uniformity requirement. Then, the processing circuitry generates a hash value for a makeup virtual node to replace the specific virtual node in the hash ring, and updates the distribution of the data in the distributed system based on the hash ring with the makeup virtual node.

In an example, the processing circuitry deletes, from the hash ring, the specific virtual node that causes the distribution to fail to satisfy the uniformity requirement, and generates the hash value for the makeup virtual node that is added into the hash ring.

In some embodiments, when the distribution of the data satisfies the uniformity requirement, the processing circuitry determines whether a number of devices in the distributed system reaches a preset number, and adding another device in the distributed system when the number of devices is lower than the preset number. For example, the processing circuitry generates second hash values respectively for a second group of virtual nodes to be added into the hash ring. The second group of virtual nodes represents a second newly added device in the distributed system. The processing circuitry then distributes the data in the distributed system according to the hash ring that includes the first virtual nodes with the first hash values and the second virtual nodes with the second hash values.

In some embodiments, the processing circuitry calculates a difference of data amounts of the distributed data to virtual nodes in the hash ring, and determines that the distribution fails to satisfy the uniformity requirement when the difference exceeds a preset threshold.

In some embodiments, the processing circuitry performs data distribution offline. When the number of devices reaches the preset number, the processing circuitry controls the distributed system to update data storage according to the hash ring. In an example, the processing circuitry determines a piece of data for a storage update to the first newly added device according to a hash value of the piece of data and the first group of virtual nodes in the hash ring. Then, the processing circuitry controls the distributed system via the interface circuitry to store the piece of data to the first newly added device.

Aspects of the disclosure also provide a non-transitory computer-readable medium storing instructions which when executed by a computer cause the computer to perform the method for data processing.

BRIEF DESCRIPTION OF THE DRAWINGS

To describe the technical solutions in the embodiments of the present disclosure more clearly, the accompanying drawings for describing the embodiments of the present disclosure are simply described in the following. The accompanying drawings are merely exemplary embodiments, and those skilled in the art can derive other drawings from the accompanying drawings.

DESCRIPTION OF EMBODIMENTS

The following clearly and completely describes the technical solutions in the embodiments of the present disclosure with reference to the accompanying drawings in the embodiments of the present disclosure. The described embodiments are merely some rather than all of the embodiments of the present disclosure. All other embodiments obtained by those of ordinary skill in the art based on the embodiments of the present disclosure shall fall within the protection scope of the present disclosure.

The embodiments of the present disclosure disclose a data processing method and apparatus and a storage medium, to achieve uniform distribution of data in machines in a distributed system, and improve system stability. For better understanding of the embodiments of the present disclosure, the following first describes an application scenario of the embodiments of the present disclosure.

Figure 1:
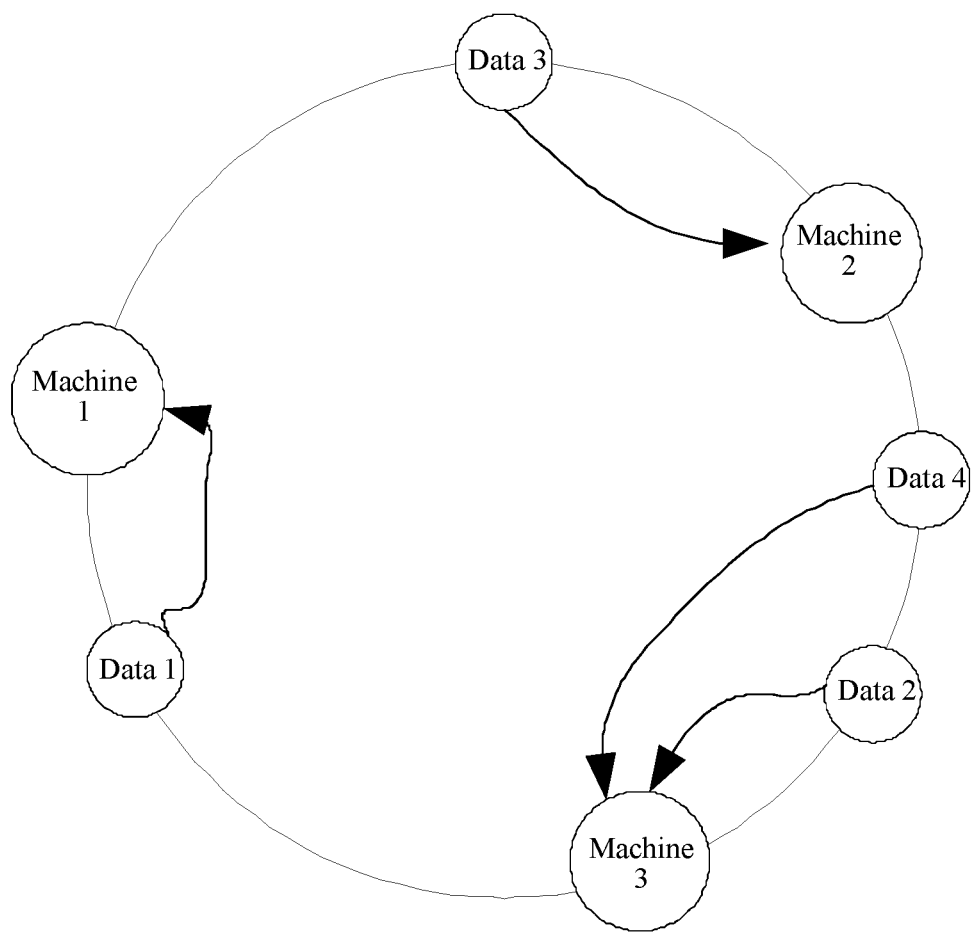
FIG. 1 is a schematic diagram of a data processing method according to an embodiment of the present disclosure.

Referring to FIG. 1, FIG. 1 is a schematic diagram of a data processing method according to an embodiment of the present disclosure. As shown in FIG. 1, in the data processing method, all data may be considered as uniformly distributed on a ring, and a machine in which a piece of data is to be stored in a distributed system is determined by setting a section managed by each machine. The ring is referred to as a hash ring. The hash ring has 0 to $2^{32}-1$ spaces. These digital spaces are connected end to end, and may be considered as a closed ring, as shown in FIG. 1. Therefore, it is referred to as a hash ring, or may be referred to as a hash space. A corresponding hash value of each piece of data may be calculated by using a hash function in a hash algorithm, and the data may be mapped to the hash ring based on the hash value. When the distributed system has a plurality of machines, a corresponding hash value of each machine may also be calculated, the machine is mapped to the hash ring, and then data corresponding to the section managed by each machine is stored in a corresponding machine in a clockwise direction. As shown in FIG. 1, data 1, data 2, data 3, data 4, a machine 1, a machine 2, and a machine 3 are located on a same hash ring. Therefore, in the clockwise direction, the data 1 is stored in the machine 1, the data 3 is stored in the machine 2, and the data 2 and the data 4 are stored in the machine 3. Because the hash ring does not change, in the data processing method, a corresponding machine based on a hash value of data can be quickly located, thereby increasing a search rate.

For improvement of system stability, how to ensure uniform distribution of data in each machine in the distributed system is a problem that urgently needs to be resolved. To resolve the problem, the embodiments of the present disclosure disclose a data processing method, to achieve uniform distribution of data in each machine in the distributed system, that is, a difference between data amounts in each machine does not exceed a preset threshold range. The following provides a detailed description.

Figure 2:
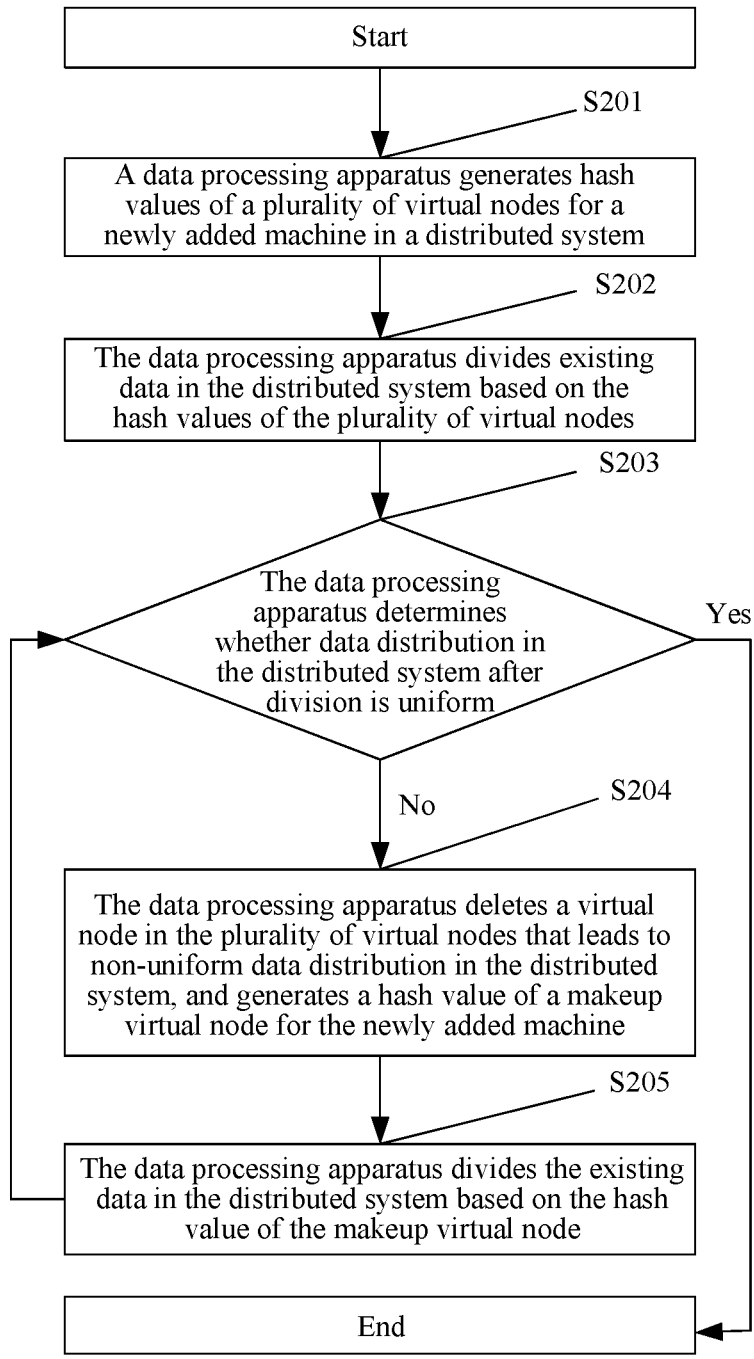
FIG. 2 is a schematic flowchart of a data processing method according to an embodiment of the present disclosure.

Referring to FIG. 2, FIG. 2 is a schematic flowchart of a data processing method according to an embodiment of the present disclosure. As shown in FIG. 2, the data processing method includes the following steps:

S201. A data processing apparatus generates hash values of a plurality of virtual nodes for a newly added machine in a distributed system.

S202. The data processing apparatus divides existing data in the distributed system based on the hash values of the plurality of virtual nodes.

S203. The data processing apparatus determines whether data distribution in the distributed system after division is uniform. If no, step S204 is performed. If yes, this procedure ends.

S204. The data processing apparatus deletes a virtual node in the plurality of virtual nodes that leads to non-uniform data distribution in the distributed system, and generates a hash value of a makeup virtual node for the newly added machine.

S205. The data processing apparatus divides the existing data in the distributed system based on the hash value of the makeup virtual node. Then step S203 is performed again.

In this embodiment of the present disclosure, the data processing apparatus may be a terminal for data management in the distributed system, or may be a terminal responsible for data balance in the distributed system, which is not limited in this embodiment of the present disclosure.

In this embodiment of the present disclosure, operations may be performed offline, and the distributed system is deployed in an actual system after the existing data in the distributed system is uniformly distributed on virtual nodes, thereby avoiding increasing network load due to continual data migration.

In this embodiment of the present disclosure, the generating hash values of a plurality of virtual nodes for a newly added machine in a distributed system may include: generating the hash values of the plurality of virtual nodes by using a same hash function in a hash algorithm by adding a suffix to an IP address of the newly added machine.

Figure 3:
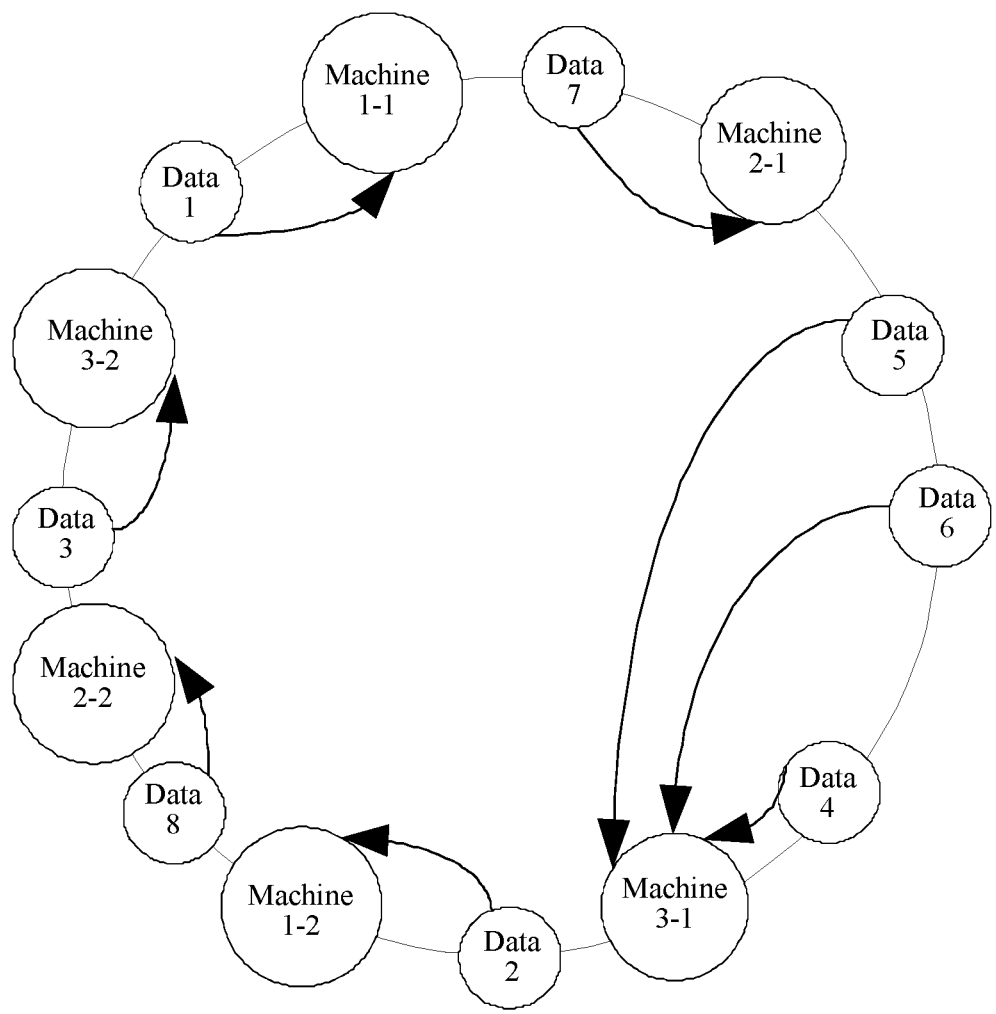
FIG. 3 is a schematic diagram of another data processing method according to an embodiment of the present disclosure.

In this embodiment of the present disclosure, that the data processing apparatus divides existing data in the distributed system based on the hash values of the plurality of virtual nodes may include: The data processing apparatus determines a location of each virtual node in the hash ring based on the hash values of the plurality of virtual nodes, and distributes data at each location in a corresponding section to each virtual node based on a preset section that each virtual node can manage. As shown in FIG. 3, virtual nodes corresponding to a machine 1 are a machine 1-1, a machine 1-2, a machine 2-1, a machine 2-2, a machine 3-1, and a machine 3-2. The virtual nodes are separately distributed at locations shown in FIG. 3 based on hash values of the virtual nodes. Correspondingly, data 1 is distributed to the machine 1-1, data 2 is distributed to the machine 1-2, data 3 is distributed to the machine 3-2, data 4, data 5, and data 6 are distributed to the machine 3-1, data 7 is distributed to the machine 2-1, and data 8 is distributed to the machine 2-2.

Figure 4:
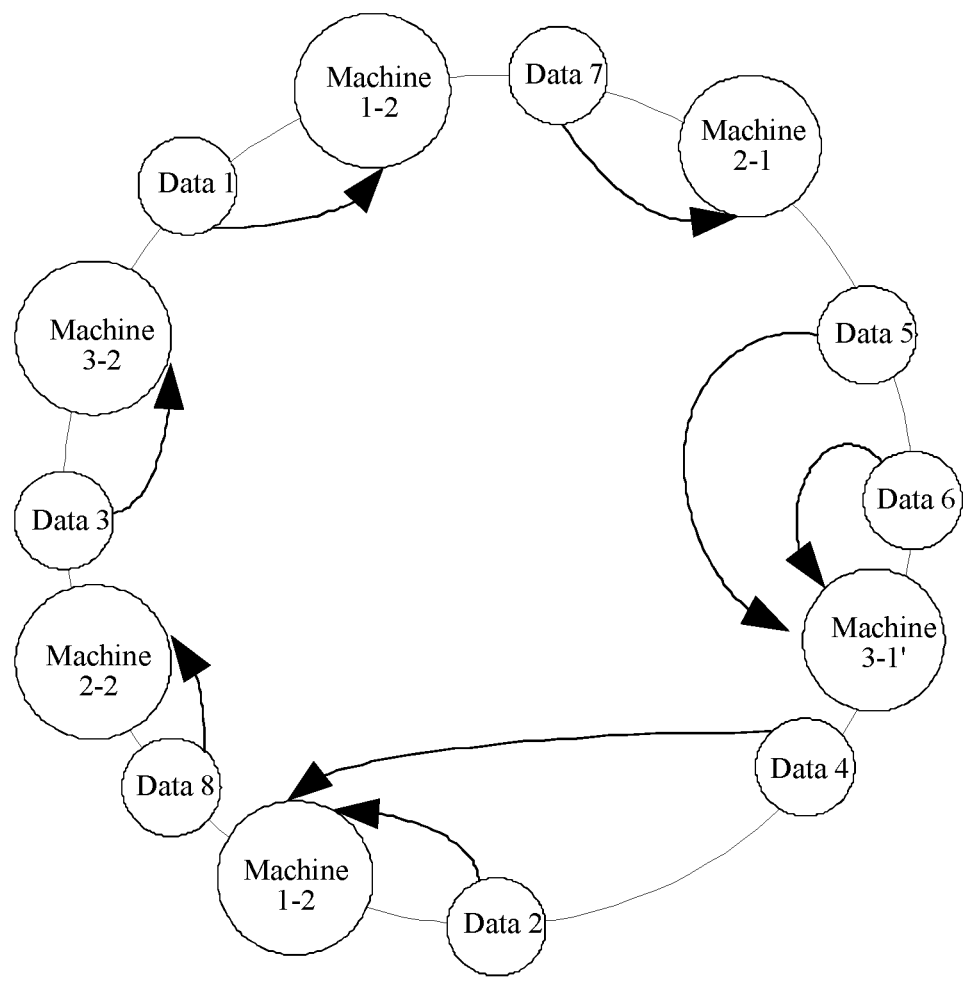
FIG. 4 is a schematic diagram of still another data processing method according to an embodiment of the present disclosure.

In this embodiment of the present disclosure, if data distribution in the distributed system after division is non-uniform, a virtual node that leads to non-uniform data distribution may be deleted, and a hash value of a makeup virtual node is generated for the newly added machine. For example, as shown in FIG. 3, excessive data is distributed to the virtual node machine 3-1, leading to non-uniform data distribution. Therefore, the machine 3-1 may be deleted, a makeup virtual node machine 3-1' may be randomly generated for the machine 3-1, and a location shown in FIG. 4 is determined based on a hash value of the makeup virtual node machine 3-1'. To be specific, the data 4 is distributed to the machine 1-2, and the data 5 and the data 6 are distributed to the machine 3-1', thereby reducing load on the machine 3-1', and achieving uniform data distribution.

Correspondingly, the existing data in the distributed system is divided based on the hash value of the makeup virtual node, so that the data can be uniformly distributed to virtual nodes. As can be seen, in this implementation, a heuristic algorithm can be used to determine hash values of a plurality of virtual nodes of a newly added machine for uniform data distribution, thereby laying a foundation for improvement of system stability.

Figure 5:
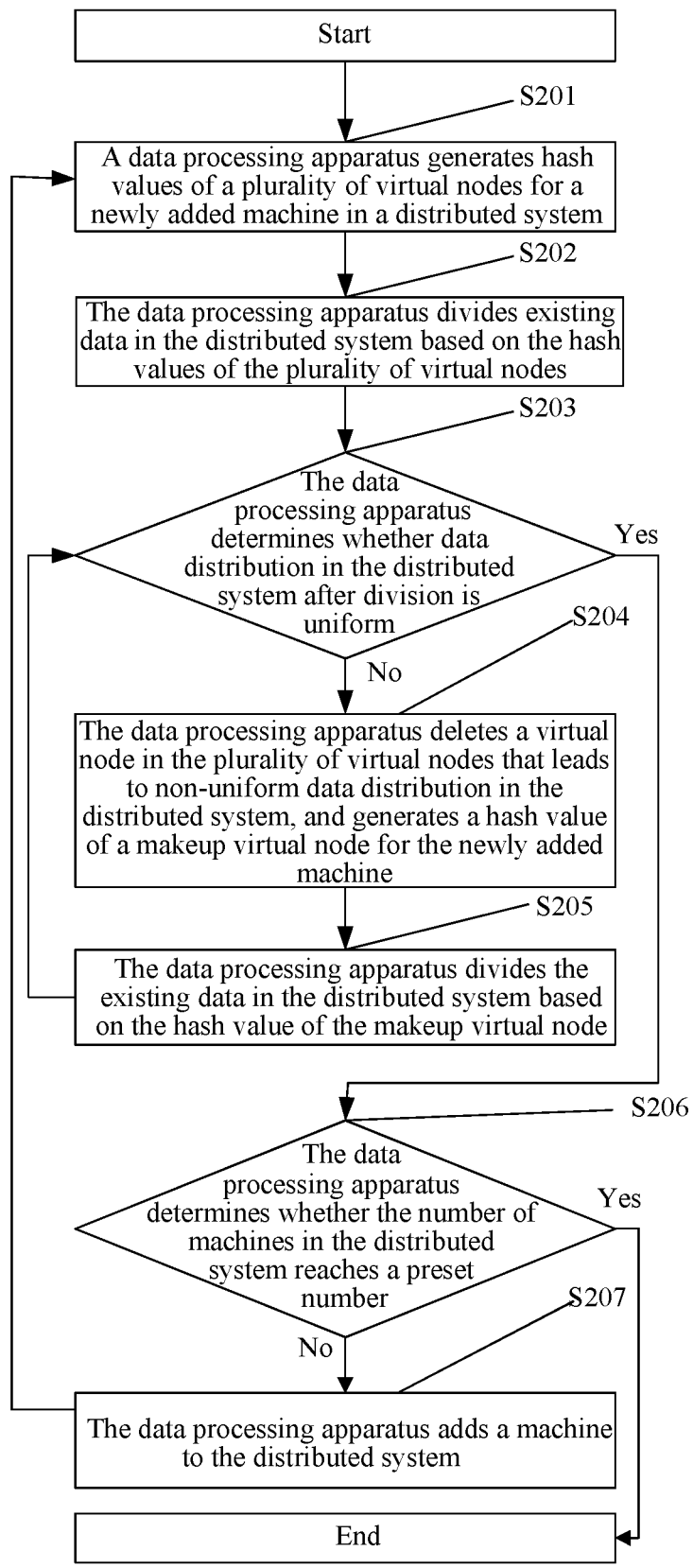
FIG. 5 is a schematic flowchart of another data processing method according to an embodiment of the present disclosure.

Referring to FIG. 5, FIG. 5 is a schematic flowchart of another data processing method according to an embodiment of the present disclosure. Different from the data processing method shown in FIG. 2, in the data processing method shown in FIG. 5, when the data processing apparatus determines that data distribution in the distributed system after division is uniform in step S203, the data processing apparatus may further perform the following steps:

S206. The data processing apparatus determines whether the number of machines in the distributed system reaches a preset number. If yes, this procedure ends. If no, step S207 is performed.

S207. The data processing apparatus adds a machine to the distributed system, and performs step S201.

In this embodiment of the present disclosure, the newly added machine may be the first machine in the distributed system. If the newly added machine is the first machine and the preset number of machines in the distributed system is greater than 1, after the data processing apparatus generates hash values of a plurality of virtual nodes for the first machine, the data processing apparatus may generate hash values of a plurality of virtual nodes for another newly added machine, to perform operations of step S202 to step S207, thereby maintaining balance of data distribution in the distributed system.

The determining whether data distribution in the distributed system after division is uniform may include: determining whether a difference between data amounts of virtual nodes in the distributed system after division does not exceed a preset threshold; and determining that data distribution in the distributed system after division is uniform if the preset threshold is not exceeded; or determining that data distribution in the distributed system after division is non-uniform if the preset threshold is exceeded. The difference between data amounts is an absolute value. For example, the difference between data amounts in machines is an absolute value of ±5%.

In an optional implementation, step S201 to step S207 may be performed when the data processing apparatus is in an offline state. Therefore, in the data processing method shown in FIG. 5, if the number of machines in the distributed system reaches the preset number, the data processing apparatus may deploy the distributed system online to update a machine in which the existing data of the distributed system is stored, and determine locations of the plurality of virtual nodes in a hash ring based on the hash values of the plurality of virtual nodes of the newly added machine in the distributed system, to determine a machine in which to-be-stored data is to be stored.

The data processing apparatus may determine a machine in which to-be-stored data is to be stored by performing the following steps:

11) calculating a hash value of the to-be-stored data;

12) calculating a location of the to-be-stored data in the hash ring based on the hash value, and determining a virtual node responsible for the to-be-stored data;

13) determining a target machine to which the virtual node belongs based on the virtual node; and 14) storing the to-be-stored data in the target machine.

As can be seen, a location, in the hash ring, of a virtual node in the distributed system may be determined by using the data processing method corresponding to step S201 to S207. The data processing method may also be referred to as a ring division algorithm.

In the data processing method shown in FIG. 5, when each machine is deployed in a distributed system, it can be ensured that data distributed to a newly added machine is uniformly distributed, thereby improving system stability.

Figure 6:
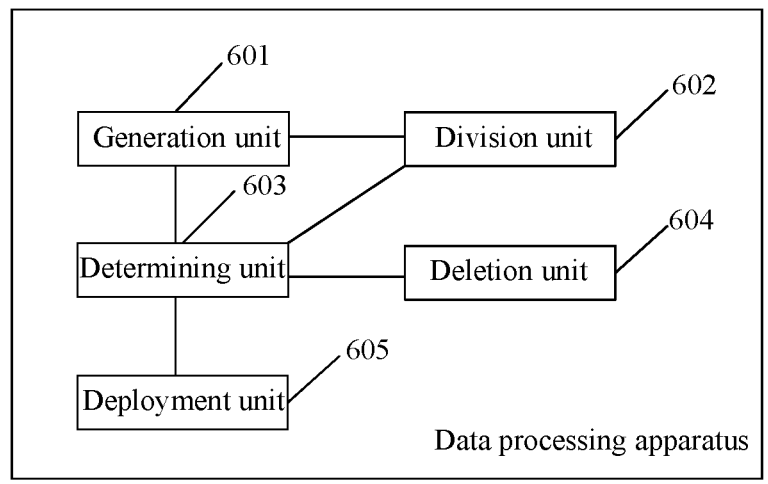
FIG. 6 is a schematic structural diagram of a data processing apparatus according to an embodiment of the present disclosure.

Referring to FIG. 6, FIG. 6 is a schematic structural diagram of a data processing apparatus according to an embodiment of the present disclosure. As shown in FIG. 6, the data processing apparatus may include the following units:

a generation unit 601, configured to generate hash values of a plurality of virtual nodes for a newly added machine in a distributed system;

a division unit 602, configured to divide existing data in the distributed system based on the hash values of the plurality of virtual nodes;

a determining unit 603, configured to determine whether data distribution in the distributed system after division is uniform; and a deletion unit 604, configured to delete, when the determining unit 603 determines that data distribution in the distributed system after division is non-uniform, a virtual node in the plurality of virtual nodes that leads to non-uniform data distribution in the distributed system, and trigger the generation unit 601 to generate a hash value of a makeup virtual node for the newly added machine; and trigger the division unit 602 to divide the existing data in the distributed system based on the hash value of the makeup virtual node.

In this embodiment of the present disclosure, after the division unit 602 divides the existing data in the distributed system based on the hash value of the makeup virtual node, the determining unit 603 determines whether data distribution in the distributed system after division is uniform; and uses, if data distribution is non-uniform, the makeup virtual node as a virtual node that leads to non-uniform data distribution in the distributed system, and triggers the deletion unit 604 to perform the operation of deleting a virtual node that leads to non-uniform data distribution in the distributed system.

In this embodiment of the present disclosure, when data distribution in the distributed system after division is uniform, the determining unit 603 determines whether the number of machines in the distributed system reaches a preset number; and triggers an addition unit to add a machine to the distributed system if the preset number has not been reached, and triggers the generation unit 601 to perform the operation of generating hash values of a plurality of virtual nodes for a newly added machine in a distributed system.

In this embodiment of the present disclosure, when determining whether data distribution in the distributed system after division is uniform, the determining unit 603 is specifically configured to: determine whether a difference between data amounts of virtual nodes in the distributed system after division does not exceed a preset threshold; and determine that data distribution in the distributed system after division is uniform if the preset threshold is not exceeded; or determine that data distribution in the distributed system after division is non-uniform if the preset threshold is exceeded. The difference between data amounts is an absolute value. For example, the difference between data amounts in machines is an absolute value of ±5%.

In this embodiment of the present disclosure, the apparatus shown in FIG. 6 may further include:

a deployment unit 605, configured to: when the number of machines in the distributed system reaches the preset number, deploy the distributed system to update a machine in which the existing data of the distributed system is stored, and determine locations of the plurality of virtual nodes in a hash ring based on the hash values of the plurality of virtual nodes of the newly added machine in the distributed system, to determine a machine in which to-be-stored data is to be stored.

In this embodiment of the present disclosure, operations may be performed offline, and the distributed system is deployed in an actual system after the existing data in the distributed system is uniformly distributed on virtual nodes, thereby avoiding increasing network load due to continual data migration.

In this embodiment of the present disclosure, that the division unit 602 divides existing data in the distributed system based on the hash values of the plurality of virtual nodes may include: determining a location of each virtual node in the hash ring based on the hash values of the plurality of virtual nodes, and distributing data at each location in a corresponding section to each virtual node based on a preset section that each virtual node can manage. Reference may be made to the related description corresponding to FIG. 3 in the foregoing embodiment, and details are not described herein again.

In this embodiment of the present disclosure, if data distribution in the distributed system after division is non-uniform, the deletion unit 604 may delete a virtual node that leads to non-uniform data distribution, and generate a hash value of a makeup virtual node for the newly added machine. Reference may be made to the related description corresponding to FIG. 4 in the foregoing embodiment, and details are not described herein again.

As can be seen, in this implementation, a heuristic algorithm can be used to determine hash values of a plurality of virtual nodes of a newly added machine for uniform data distribution, thereby improving system stability.

In this embodiment of the present disclosure, the deployment unit 605 deploys the distributed system online to update a machine in which the existing data of the distributed system is stored, and determines locations of the plurality of virtual nodes in a hash ring based on the hash values of the plurality of virtual nodes of the newly added machine in the distributed system, to determine a machine in which to-be-stored data is to be stored.

After the deployment unit 605 deploys the distributed system online to update the machine in which the existing data of the distributed system is stored, the data processing apparatus may further determine a machine in which to-be-stored data is to be stored, which may include the following operations: calculating a hash value of the to-be-stored data; calculating a location of the to-be-stored data in the hash ring based on the hash value, and determining a virtual node responsible for the to-be-stored data; determining a target machine to which the virtual node belongs based on the virtual node; and storing the to-be-stored data in the target machine.

In this embodiment of the present disclosure, a process of distributing data to a virtual node in the distributed system by the data processing apparatus may also be referred to as a ring division algorithm. As can be seen, the data processing apparatus may delete, by using the generation unit 601, the division unit 602, the determining unit 603, and the deletion unit 604, a virtual node that leads to non-uniform data distribution in the distributed system, thereby achieving uniform data distribution.

During actual application, the generation unit 601, the division unit 602, the determining unit 603, the deletion unit 604, and the deployment unit 605 may be implemented by using a central processing unit (CPU), a microprocessor (MPU), a digital signal processor (DSP), or a field-programmable gate array (FPGA).

Figure 7:
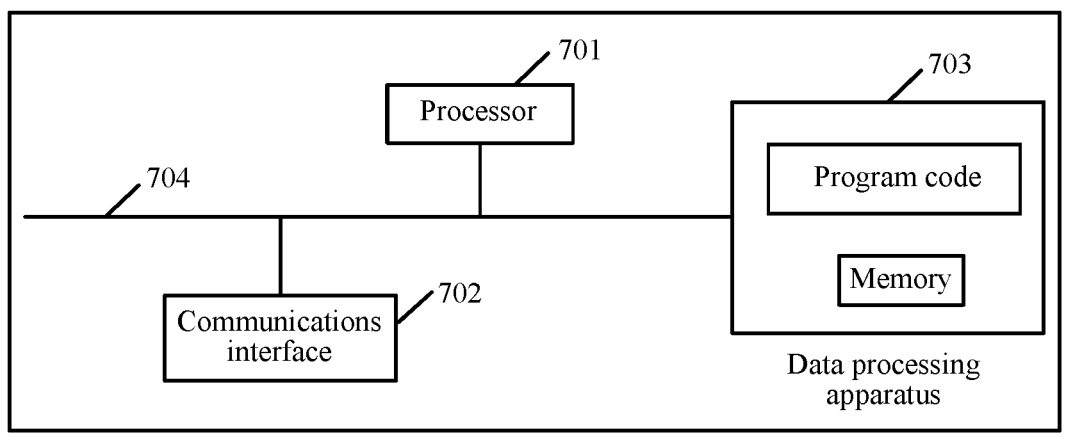
FIG. 7 is a schematic diagram of a hardware structure of a data processing apparatus according to an embodiment of the present disclosure.

Referring to FIG. 7, FIG. 7 is a schematic diagram of a hardware structure of a data processing apparatus according to an embodiment of the present disclosure. As shown in FIG. 7, the data processing apparatus may include a processor 701, a communications interface 702, a memory 703, and a communications bus 704. The communications bus 704 is configured to implement communication connections between these components. The communications interface 702 is configured to implement communication connections between machines in a distributed system. The memory 703 may be a high-speed random access memory (RAM), or may be a non-volatile memory, for example, at least one magnetic disk storage. Optionally, the memory 703 may alternatively be at least one storage apparatus that is located far away from the processor 701. The processor 701 may be an integrated circuit chip with a signal processing capability. In an implementation process, steps of the method in the foregoing embodiments of the present disclosure may be completed by using a hardware-integrated logic circuit in the processor or instructions in a form of software. Further, the processor may be a general-purpose processor, a DSP or another programmable logic device, discrete gate, or transistor logic device, a discrete hardware component, or the like. The processor may implement or execute methods, steps, and logical block diagrams disclosed in the embodiments of the present disclosure. The general-purpose processor may be a microprocessor or any conventional processor or the like. Steps of the methods disclosed by using the embodiments of the present disclosure may be directly performed and completed by a hardware decoding processor, or may be performed and completed by using a combination of hardware in the decoding processor and a software module. The software module may be located in a storage medium. The storage medium is located in the memory. The processor reads information in the memory, and completes steps of the method in combination with hardware thereof.

In an embodiment, the processor 701 may be combined with the data processing apparatus shown in FIG. 6, the memory 703 stores a set of program code, and the processor 701 invokes the program code stored in the memory 703 to perform the following operations:

generating hash values of a plurality of virtual nodes for a newly added machine in a distributed system;

dividing existing data in the distributed system based on the hash values of the plurality of virtual nodes;

determining whether data distribution in the distributed system after division is uniform;

deleting, if data distribution is non-uniform, a virtual node in the plurality of virtual nodes that leads to non-uniform data distribution in the distributed system, and generating a hash value of a makeup virtual node for the newly added machine; and dividing the existing data in the distributed system based on the hash value of the makeup virtual node.

In an embodiment, the processor 701 invokes the program code stored in the memory 703 to perform the following operations after the dividing the existing data in the distributed system based on the hash value of the makeup virtual node:

determining whether data distribution in the distributed system after division is uniform; and using, if data distribution is non-uniform, the makeup virtual node as a virtual node that leads to non-uniform data distribution in the distributed system, and performing the operation of deleting a virtual node that leads to non-uniform data distribution in the distributed system.

In an embodiment, the processor 701 invokes the program code stored in the memory 703 to perform the following operations when data distribution in the distributed system after division is uniform:

determining whether the number of machines in the distributed system reaches a preset number; and adding a machine to the distributed system if the preset number has not been reached, and performing the operation of generating hash values of a plurality of virtual nodes for a newly added machine in a distributed system.

In an embodiment, the processor 701 invokes the program code stored in the memory 703 to perform the following operations when determining whether data distribution in the distributed system after division is uniform:

determining whether a difference between data amounts of virtual nodes in the distributed system after division does not exceed a preset threshold; and determining that data distribution in the distributed system after division is uniform if the preset threshold is not exceeded; or determining that data distribution in the distributed system after division is non-uniform if the preset threshold is exceeded.

In an embodiment, the processor 701 invokes the program code stored in the memory 703 to perform the following operation when the number of machines in the distributed system reaches the preset number:

deploying the distributed system to update a machine in which the existing data of the distributed system is stored, and determining locations of the plurality of virtual nodes in a hash ring based on the hash values of the plurality of virtual nodes of the newly added machine in the distributed system, to determine a machine in which to-be-stored data is to be stored.

In an embodiment, after deploying the distributed system online to update the machine in which the existing data of the distributed system is stored, the processor 701 may further determine a machine in which to-be-stored data is to be stored, which may include the following operations: calculating a hash value of the to-be-stored data; calculating a location of the to-be-stored data in the hash ring based on the hash value, and determining a virtual node responsible for the to-be-stored data; determining a target machine to which the virtual node belongs based on the virtual node; and storing the to-be-stored data in the target machine.

In this embodiment of the present disclosure, a process of distributing data to a virtual node in the distributed system by the processor 701 may also be referred to as a ring division algorithm.

It is noted herein that the descriptions of the apparatus embodiments are similar to the descriptions of the method embodiments, and have similar beneficial effects as the method embodiments, and therefore no further description is provided. For the technical details not disclosed in the apparatus embodiments of the present disclosure, refer to the descriptions of the method embodiments of the present disclosure for understanding. For brevity, no further description is provided.

An embodiment of the present disclosure further provides a computer-readable storage medium, for example, a memory including a computer program. The computer program may be run by the processor of the data processing apparatus, to complete the steps of the method. Herein, the computer-readable storage medium may be a memory such as a ferromagnetic random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM); or may be various devices including one or any combination of the foregoing memories.

Further, the computer-readable storage medium stores a computer program, and the computer program is run by a processor to implement the following steps:

generating hash values of a plurality of virtual nodes for a newly added machine in a distributed system;

dividing existing data in the distributed system based on the hash values of the plurality of virtual nodes;

determining whether data distribution in the distributed system after division is uniform;

deleting, if data distribution is non-uniform, a virtual node in the plurality of virtual nodes that leads to non-uniform data distribution in the distributed system, and generating a hash value of a makeup virtual node for the newly added machine; and dividing the existing data in the distributed system based on the hash value of the makeup virtual node.

In an embodiment, after the dividing the existing data in the distributed system based on the hash value of the makeup virtual node, the method further includes:

determining whether data distribution in the distributed system after division is uniform; and using, if data distribution is non-uniform, the makeup virtual node as a virtual node that leads to non-uniform data distribution in the distributed system, and performing the step of deleting a virtual node that leads to non-uniform data distribution in the distributed system.

In an embodiment, if data distribution in the distributed system after division is uniform, the method further includes:

determining whether the number of machines in the distributed system reaches a preset number; and adding a machine to the distributed system if the preset number has not been reached, and performing the step of generating hash values of a plurality of virtual nodes for a newly added machine in a distributed system.

In an embodiment, the determining whether data distribution in the distributed system after division is uniform includes:

determining whether a difference between data amounts of virtual nodes in the distributed system after division does not exceed a preset threshold; and determining that data distribution in the distributed system after division is uniform if the preset threshold is not exceeded; or determining that data distribution in the distributed system after division is non-uniform if the preset threshold is exceeded.

In an embodiment, if the number of machines in the distributed system reaches the preset number, the method further includes:

deploying the distributed system to update a machine in which the existing data of the distributed system is stored, and determining locations of the plurality of virtual nodes in a hash ring based on the hash values of the plurality of virtual nodes of the newly added machine in the distributed system, to determine a machine in which to-be-stored data is to be stored.

In the several embodiments provided in this application, it is understood that the disclosed device and method may be implemented in other manners. The described device embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections between components may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located at one place, or may be distributed on a plurality of network units. Some or all of the units may be selected depending on actual needs to achieve the objectives of the solutions of the embodiments.

In addition, functional units in the embodiments of the present disclosure may be all integrated into one processing unit, or each of the units may exist alone, or two or more units may be integrated into one unit. The integrated unit may be implemented in a form of hardware, or may be implemented in a form of hardware in addition to a software functional unit.

Those of ordinary skill in the art may understand that all or some of the steps of the method embodiments may be implemented by a program instructing relevant hardware. The program may be stored in a computer-readable storage medium. When the program runs, the steps of the method embodiments are performed. The storage medium may include various media that can store program code, such as a mobile storage device, a ROM, a RAM, a magnetic disk, or an optical disc.

Alternatively, when the integrated unit in the present disclosure is implemented in the form of a software functional module and sold or used as an independent product, the integrated module may be stored in a computer-readable storage medium. Based on such an understanding, the technical solutions in the embodiments of the present disclosure essentially or the part contributing to the existing technologies may be implemented in a form of a software product. The software product is stored in a storage medium, and includes several instructions for instructing a computer device (which may be a personal computer, a server, or a network device) to perform all or some of the steps of the methods described in the embodiments of the present disclosure. The storage medium includes various media that can store program code, such as a mobile storage device, a ROM, a RAM, a magnetic disk, or an optical disc.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

The descriptions are merely specific implementations of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the embodiments of the present disclosure, hash values of a plurality of virtual nodes can be generated for a newly added machine in a distributed system. Existing data in the distributed system is divided based on the hash values of the plurality of virtual nodes. It is determined whether data distribution in the distributed system after division is uniform. A virtual node in the plurality of virtual nodes that leads to non-uniform data distribution in the distributed system is deleted if data distribution is non-uniform, and a hash value of a makeup virtual node is generated for the newly added machine. The existing data in the distributed system is then divided based on the hash value of the makeup virtual node. In this way, a foundation is laid for uniform distribution of data in machines and improvement of system stability.

What is claimed is:

1. A method for data processing, comprising:
generating first hash values respectively for a first group of virtual nodes to be added into a hash ring that is used to distribute data in a distributed system, the first group of virtual nodes representing a first newly added device in the distributed system;
distributing the data in the distributed system according to the hash ring that includes the first group of virtual nodes with the first hash values;
determining whether the distribution of the data in the distributed system satisfies a uniformity requirement;
identifying, when the distribution of the data in the distribution system fails to satisfy the uniformity requirement, a specific virtual node in the first group of virtual nodes that causes the distribution to fail the uniformity requirement;
generating a hash value for a makeup virtual node to replace the specific virtual node in the hash ring; and
updating the distribution of the data in the distributed system based on the hash ring with the makeup virtual node.

2. The method according to claim 1, further comprising:
deleting, from the hash ring, the specific virtual node that causes the distribution to fail to satisfy the uniformity requirement; and
generating the hash value for the makeup virtual node that is added into the hash ring.

3. The method according to claim 1, further comprising:
when the distribution of the data satisfies the uniformity requirement, determining whether a number of devices in the distributed system reaches a preset number; and
adding another device in the distributed system when the number of devices is lower than the preset number.

4. The method according to claim 3, further comprising:
when the number of devices reaches the preset number, deploying the distributed system to update data storage according to the hash ring.

5. The method according to claim 4, further comprising:
determining a piece of data for a storage update to the first newly added device according to a hash value of the piece of data and the first group of virtual nodes in the hash ring; and
storing the piece of data to the first newly added device.

6. The method according to claim 1, further comprising:
generating second hash values respectively for a second group of virtual nodes to be added into the hash ring, the second group of virtual nodes representing a second newly added device in the distributed system; and
distributing the data in the distributed system according to the hash ring that includes the first virtual nodes with the first hash values and the second virtual nodes with the second hash values.

7. The method according to claim 1, further comprising:
calculating a difference of data amounts of the distributed data to virtual nodes in the hash ring; and
determining that the distribution fails to satisfy the uniformity requirement when the difference exceeds a preset threshold.

8. An apparatus, comprising:
interface circuitry configured to connect the apparatus into a distributed system; and
processing circuitry configured to:
generate first hash values respectively for a first group of virtual nodes to be added into a hash ring that is used to distribute data in a distributed system, the first group of virtual nodes representing a first newly added device in the distributed system;
distribute the data in the distributed system according to the hash ring that includes the first group of virtual nodes with the first hash values;
determine whether the distribution of the data in the distributed system satisfies a uniformity requirement;
identify, when the distribution of the data in the distribution system fails to satisfy the uniformity requirement, a specific virtual node in the first group of virtual nodes that causes the distribution to fail the uniformity requirement;
generate a hash value for a makeup virtual node to replace the specific virtual node in the hash ring; and
update the distribution of the data in the distributed system based on the hash ring with the makeup virtual node.

9. The apparatus according to claim 8, wherein the processing circuitry is configured to:
delete, from the hash ring, the specific virtual node that causes the distribution to fail to satisfy the uniformity requirement; and
generate the hash value for to the makeup virtual node that is added into the hash ring.

10. The apparatus according to claim 8, wherein the processing circuitry is configured to:
when the distribution of the data satisfies the uniformity requirement, determine whether a number of devices in the distributed system reaches a preset number; and
add another device in the distributed system when the number of devices is lower than the preset number.

11. The apparatus according to claim 8, wherein the processing circuitry is configured to:
generate second hash values respectively for a second group of virtual nodes to be added into the hash ring, the second group of virtual nodes representing a second newly added device in the distributed system; and
distribute the data in the distributed system according to the hash ring that includes the first virtual nodes with the first hash values and the second virtual nodes with the second hash values.

12. The apparatus according to claim 8, wherein the processing circuitry is configured to:
calculate a difference of data amounts of the distributed data to virtual nodes in the hash ring; and
determine that the distribution fails to satisfy the uniformity requirement when the difference exceeds a preset threshold.

13. The apparatus according to claim 12, wherein the processing circuitry is configured to:
when the number of devices reaches the preset number, deploy the distributed system to update data storage according to the hash ring.

14. The apparatus according to claim 13, wherein:
the processing circuitry is configured to:
determine a piece of data for a storage update to the first newly added device according to a hash value of the piece of data and the first group of virtual nodes in the hash ring; and
control, via the interface circuitry, the distributed system to store the piece of data to the first newly added device.

15. A non-transitory computer-readable medium storing instructions which when executed by a computer cause the computer to perform:
generating first hash values respectively for a first group of virtual nodes to be added into a hash ring that is used to distribute data in a distributed system, the first group of virtual nodes representing a first newly added device in the distributed system;
distributing the data in the distributed system according to the hash ring that includes the first group of virtual nodes with the first hash values;
determining whether the distribution of the data in the distributed system satisfies a uniformity requirement;
identifying, when the distribution of the data in the distribution system fails to satisfy the uniformity requirement, a specific virtual node in the first group of virtual nodes that causes the distribution to fail the uniformity requirement;
generating a hash value for a makeup virtual node to replace the specific virtual node in the hash ring; and
updating the distribution of the data in the distributed system based on the hash ring with the makeup virtual node.

16. The non-transitory computer-readable medium according to claim 15, wherein the instructions cause the computer to further perform:
deleting, from the hash ring, the specific virtual node that causes the distribution to fail to satisfy the uniformity requirement; and
generating the hash value for to the makeup virtual node that is added into the hash ring.

17. The non-transitory computer-readable medium according to claim 15, wherein the instructions cause the computer to further perform:
when the distribution of the data satisfies the uniformity requirement, determining whether a number of devices in the distributed system reaches a preset number; and
adding another device in the distributed system when the number of devices is lower than the preset number.

18. The non-transitory computer-readable medium according to claim 17, wherein the instructions cause the computer to further perform:
when the number of devices reaches the preset number, controlling, via an interface circuitry of the computer, the distributed system to update data storage according to the hash ring.

19. The non-transitory computer-readable medium according to claim 15, wherein the instructions cause the computer to further perform:
generating second hash values respectively for a second group of virtual nodes to be added into the hash ring, the second group of virtual nodes representing a second newly added device in the distributed system;
distributing the data in the distributed system according to the hash ring that includes the first virtual nodes with the first hash values and the second virtual nodes with the second hash values.

20. The non-transitory computer-readable medium according to claim 15, wherein the instructions cause the computer to further perform:
  calculating a difference of data amounts of the distributed data to virtual nodes in the hash ring; and
  determining that the distribution fails to satisfy the uniformity requirement when the difference exceeds a preset threshold.

* * * * *